May 6, 1947.  W. WORTH  2,419,980
TEMPERATURE CONTROL UNIT
Filed Jan. 4, 1941  2 Sheets-Sheet 1
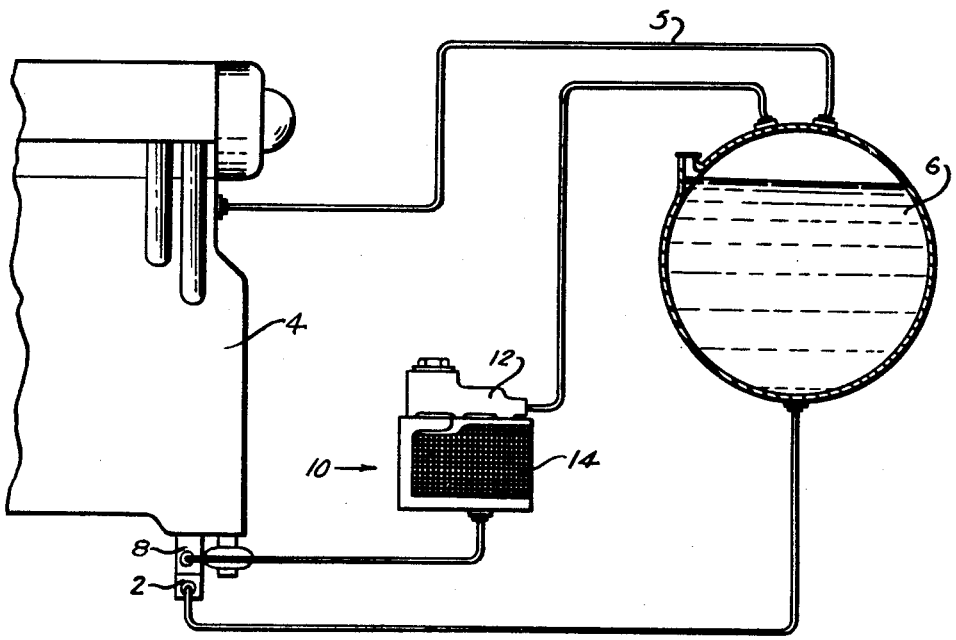
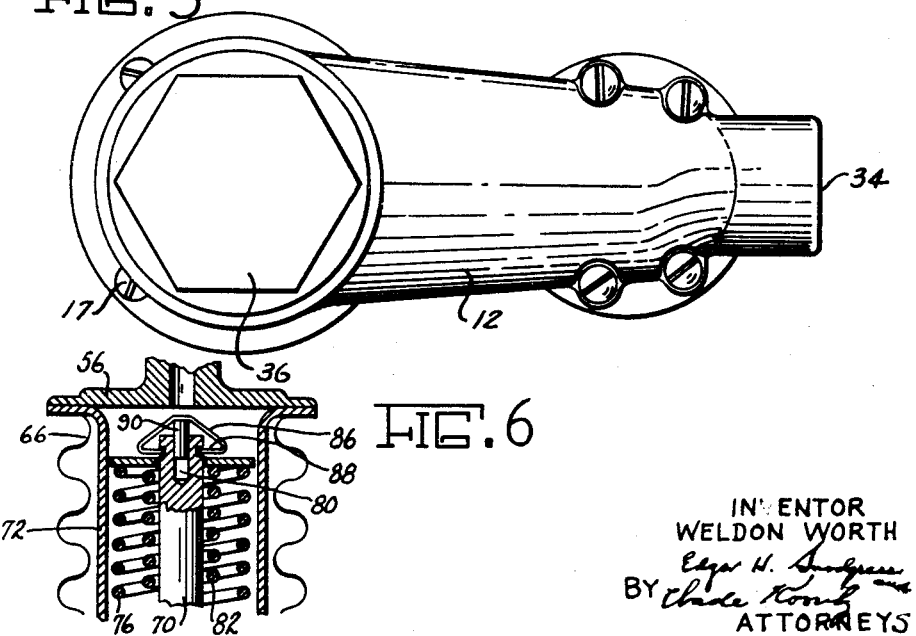
INVENTOR
WELDON WORTH
BY
ATTORNEYS

INVENTOR
WELDON WORTH
BY
ATTORNEYS

Patented May 6, 1947

2,419,980

UNITED STATES PATENT OFFICE 2,419,980

TEMPERATURE CONTROL UNIT

Weldon Worth, Dayton, Ohio

Application January 4, 1941, Serial No. 373,150

14 Claims. (Cl. 236—34)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for regulating the flow of a fluid through one or the other of several passages in order to control the temperature of the circulating fluid within desired limits. It also pertains to an arrangement whereby a thermostatic element of the flexible metal bellows type will move to the desired position in case of a bellows failure.

While for illustrative purpose, but with no intent to unduly limit the scope or application of the invention, it is herein shown and described in its application to lubricating systems for engines, for which it is especially adapted, it is to be understood that it is not limited thereto, but is of general application.

In the lubrication system of an aircraft engine or other internal combustion engines, it is usually necessary to cool the oil after it passes through the engine to maintain its temperature and viscosity within safe operating limits.

The oil cooler in such a system must have ample cooling capacity for the most severe or abnormal conditions and will, therefore, be over capacity for normal operating conditions. If the over-cooling is to be prevented under some conditions, it is necessary to have means for limiting the amount of cooling effect according to the operating conditions. Many of the existing oil coolers are designed with a by-pass jacket and accomplish this temperature control by directing the oil through this by-pass jacket when it is too cold, instead of through the cooling element of the apparatus. This jacket also keeps the passage through the cooling element sufficiently warm to be cleared of congealed oil and permit the reestablishment of oil flow therethrough when cooling is desired.

A problem of temperature control with this type of apparatus is to afford full automatic operation that will control the oil cooling to the desired degree and maintain a predetermined condition of temperature under all the variable conditions existing in airplane operation, and provide maximum compactness, reliability and safety under operating conditions and in event of failure of the device.

Different types of existing temperature control units accomplish some of these objects, but fail to combine all of them in one apparatus. For example, it is extremely desirable to have the control go to a cooling position in event of failure. Some existing thermostatic devices accomplish this object by using a subatmospheric pressure bellows valve, wherein a leak in the bellows will raise its internal pressure and have the same effect as heat. Where this method has been used, however, the low operating forces impair the reliability. Because of the low operating forces, piston valves have been used which are more susceptible to sticking than poppet valves. Such a valve is also influenced to an undesirable extent by the change in atmospheric pressure with altitude, since the atmospheric pressure at 30,000 feet is about one-third that at sea level. Other devices have a high pressure in the bellows to minimize the effect of altitude and permit the use of poppet valves, but these go to a non-cooling position in case of failure.

Another problem is to obtain regulation of the temperature of the oil going into the engine within the cooling capacity of the oil cooler, and at the same time have a simple installation with a minimum of brackets and plumbing.

There are also many thermostatic devices of the high pressure bellows type in many applications that normally expand to operate a control or warning signal when the bellows is subjected to heat, and it is desirable to provide an arrangement that will move the mechanism in the same direction, if the bellows fails and can no longer build up the normal actuating pressure.

My invention, therefore, has for one of its objects, to provide a novel method of regulating the temperature of a fluid in a fluid circuit to a substantially constant temperature within the capacity of the equipment, under conditions of varying ambient temperatures, varying quantities of fluid flow, and varying pressure drops in elements of the fluid circuit.

It is a further object of my invention to provide a temperature control device in a fluid circuit of the high vapor pressure actuated or equivalent type which will go into the cold position, or the position inducing cooling, in case of a failure of the bellows which forms the pressure chamber.

It is a further object of my invention to provide a pressure operated valve mechanism having means operative upon a failure of the operating pressure to impart to the valve member the same movement that is imparted thereto by a high pressure.

It is a further object of my invention to provide a temperature control device applicable to any arrangement incorporating a bellows type temperature control unit that will produce the same operating movement when the bellows fail, that is provided when the bellows is subjected to the higher limits of its operating temperature.

It is a further object of my invention to provide a compact unit for oil temperature control for use with an internal combustion engine which may be attached directly to the oil cooler without external plumbing, and which regulates the oil delivered from the cooler to a substantially constant temperature.

It is a further object of my invention to provide a valve for controlling oil temperature in an oil cooling circuit that regulates properly under all the adverse conditions and is at the same time simple in design, practical and free from piston valves and free from inherent dangers of mechanical failures.

Other and further objects of my invention will appear from a more detailed description of the invention taken in connection with the drawings which form a part of this specification.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein are shown the preferred but obviously not necessarily the only embodiments of the invention, Fig. 1 is a diagrammatic view showing an internal combustion engine lubrication system embodying my invention.

Fig. 3 is a plan view of the thermostatic control valve shown in Fig. 2, without the oil cooler.

Fig. 6 is an enlarged view of a portion of the sectioned part of Fig. 2 showing more clearly the center post, and release mechanism.

Figure 2:
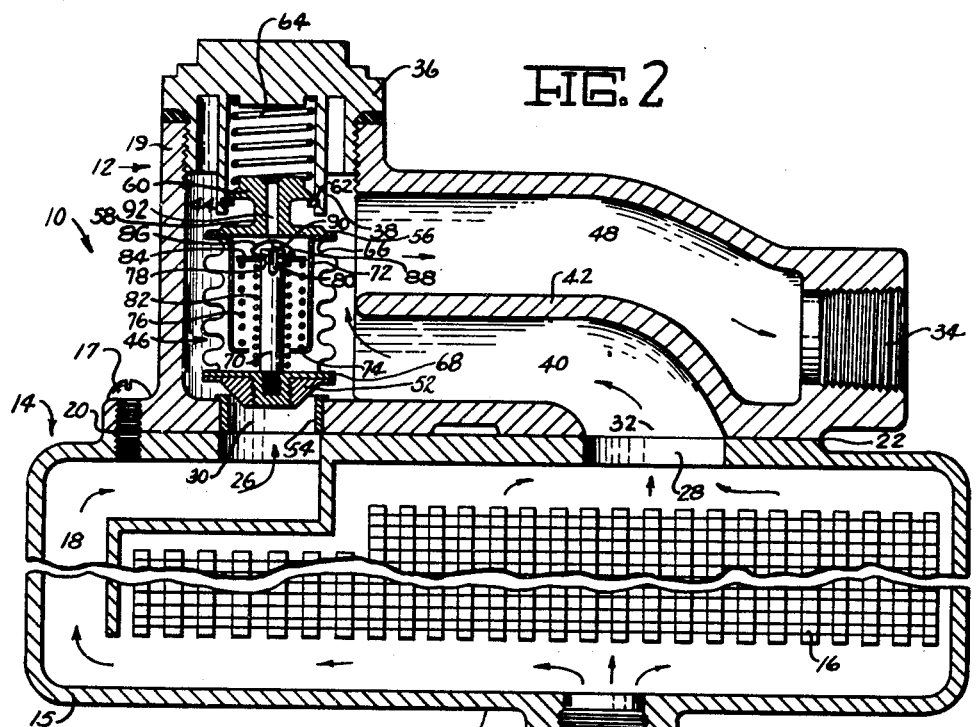
Fig. 2 is a sectional view taken longitudinally of a thermostatic control valve device embodying my invention shown in conjunction with a diagrammatic illustration of an oil cooler.

The invention has been illustrated in connection with an internal combustion engine which is provided with an oil circulating system including a viscosity control unit forming the subject matter hereof.

Like parts are indicated by similar characters of reference throughout the several views.

The oil circulating system shown in Fig. 1 comprises an oil pump 2 between an engine 4 and a source of supply 6 for supplying oil to the engine under pressure; a pump 8 for withdrawing scavenged oil from the engine and returning the same to the source of supply, and an oil cooler and temperature control unit 10 through which the oil is passed after leaving the engine prior to its return to the source of supply.

Referring to Fig. 2, the unit 10 comprises a heat exchange member or radiator 14 for cooling the oil, and a thermostatic valve 12 for regulating the amount of cooling.

The oil cooler, as illustrated herein, is of a well-known type of cellular core tube construction and does not per se constitute a part of my invention. The cooler or heat exchange unit essentially consists of a casing 15 enclosing a core 16 which affords multiple restricted passages for the flow of oil when being cooled, and a duct 18 which constitutes an unrestricted passage for the by-pass flow of oil when cooling is not required.

The passage 18 and core 16 each communicate with a common inlet 24, but communicate with separate outlets 26 and 28 respectively from the heat exchange member. These outlets are formed in the pads 22 and 20 to which the thermostatic valve 12 is mated and attached by means of the hold-down screws 17 which pass through a flange on the main housing 19 of the valve 12, and thus form a readily detachable means of securing the valve to the cooler or heat exchange member.

The main housing 19 of the valve 12 is formed with two inlet ports 30 and 32 and a single outlet port 34. An opening at the top of the valve is closed by the cap 36 and secured in place by the screw threads that mate with threads in the housing 19.

The inlet port 32 of the valve housing communicates by means of the oil cooler outlet 28 with the restricted passages through cooling element or core 16, and is open at all times. The oil flowing through this inlet port 32 always has an open path to the outlet port 34. This path includes the passage 40, formed by the outer walls of the main housing 19 and the partition 42, into the chamber 44 containing the thermostatic element 46. It flows thence through the passage 48, also formed by the partition 42 and the outer wall of the main housing 19, to the outlet port 34.

The other inlet port 30 communicates with the oil cooler outlet 26 and the unrestricted passage 18 from the inlet 24. Communication between the inlet port 30 and the chamber 44 is open or closed depending upon the position of the valve poppet 52 with respect to the valve seat 54.

The upper end of thermostatic element 46 is closed by end plate 56 which also serves to hold the thermostatic element with reference to the housing 19 and cap 36. The end plate 56 has a narrow cylindrical portion 58, and an expanded circular head 60 which is urged against the stop 62 by the spring 64. The cap 36, which is threaded to mate with the housing 19, has the tubular extension 38 extending downward to receive the end 60 of end plate 56 and also to guide and retain the spring.

The stop 62 is formed as a snap ring which fits into a recess in the extension 38 of cap 36. The stop formed by this snap ring positions the thermostatic element 46 and valve poppet 52 with reference to valve seat 54, and the spring 64 provides a limit to the maximum closing force which can be exerted by the element 46. When this force is exceeded, the head 60 moves into the tubular extension 38 of cap 36, compressing the spring 64, and permits the unseating of the valve poppet 52 as long as that maximum predetermined force exists. This provides in effect a pressure relief for oil flow through the by-pass passage 18 under all circumstances, regardless of the operation of the thermostatic element 46 whenever the restriction of core 16 becomes excessive, as by the congealing of the oil.

The thermostatic element 46 preferably comprises the corrugated flexible metal bellows or Sylphon 66, the lower end plate 68, the upper end plate 56, and thus constitutes a variable volume chamber within which parts of the controlling mechanism are enclosed.

The center post 70 is threaded into end plate 68 at its lower end and is thereby rigidly attached to and moves with the lower end plate. The tubular spring retainer 72 is soldered to the upper end plate 56 at the point where the bellows is also soldered to this end plate, and the lower end of retainer 72 has a supporting ledge 74 against which the spring 76 rests at its lower end. The upper end of the center post 70 has a circular external recess 78 and a centrally located hole 80. The spring 76 and also the spring 82 are restrained at their upper end by washer 84, which has a center hole through which the post 70 extends, and which permits the washer to slide freely over the center post. The lower end of spring 82 abuts against the lower end plate 68. The springs 82 and 76 tend to force the washer 84 past the recess 78, but are prevented from so doing by the spring clip 86, which has key fingers 88 which are urged into the recess 78 by the main portion of the spring clip, and being retained in this position prevent the washer 84 from being forced off the end of the center post 70. The spring clip also has a guide post 90 which mates with the hole 80 and maintains the center alignment of the spring clip.

The chamber formed by the bellows and end plates is leak-tight at all joints, and well soldered. The element is charged with a suitable liquid having the desired vapor pressure characteristics, such as ethyl-chloride or other liquid, which will provide the operating pressures at the desired temperatures. This charging is accomplished through the drilled hole 92, which is then closed at its upper end with solder.

In the assembly of the element, sufficient charging fluid is enclosed under ample pressure within the bellows to overcome the retractive influence of the spring 76 and limit the movement of the valve 52 so that the spring maintains the valve in an open position under all normal conditions of operation below the closing temperatures, substantially as shown in Fig. 2. This is best done by completely filling the bellows in a partially extended position, with the charging fluid in liquid form, and thus excluding all air.

If the temperature sensitive fluid with which the bellows is charged is raised to an operating temperature, the pressure within the bellows is increased to the point where it exerts enough pressure against the end plates of the latter to compress the spring 76 and move the valve poppet 52 toward its seat. The spring 82 is confined under compression between the lower end plate 52 and the washer 84, which is normally held against outward movement with relation to the center post 70 and end plate 52, and, therefore, is inoperative during the normal working stroke of the bellows from the position shown in Fig. 2 to the closed position when maximum cooling is provided.

If for any reason there is a leakage of temperature sensitive fluid with which the bellows is charged, or if the bellows is ruptured for any reason resulting in a loss of the liquid, the spring 76 will then cause a further decrease in the spacing between the two end plates. As the center post 70 is moved closer to the end plate 56, the spring clip 86 comes in contact with the end plate 56. The spring clip 86 is so proportioned that the depression of the central part thereof by contact with end plate 56 will force the guide post 90 into the opening 80 in the center post and force the key fingers 88 out of the recess 78. As the center portion of the spring clip is forced downward, it changes the shape of the spring clip from an inverted V to that approaching a straight line, and this obviously increases the spacing between the ends of the key fingers and thus forces them out of the recess as described above.

In the condition described above, where there is a loss of liquid and the spring 76 forces the spring clip against the end plate 56, the release of the key fingers from the recesses in the center post 70 allows the spring 76 and also the spring 82 to force the washer 84 off of the end of the center post, and the washer is then forced against the end plate 56. When this happens, the spring 82, which was formerly inactive because it was anchored at both ends of the center post, can now exert force on the two end plates 68 and 56, and increase the spacing between the end plates moving the valve poppet 52 toward the valve seat. Thus it can be seen that when the element is exposed to high temperatures, it expands and closes the valve. Likewise, if a leak develops in the bellows, it collapses to the point where the spring clip releases the precompressed spring 82, and this forces the expansion of the pressure responsive element, producing the same valve action as if the bellows were exposed to a high temperature.

At the initial starting of the engine, the oil within the radiator or core of the cooling unit being cool and partially congealed or highly viscous, the warm oil returning from the engine following the line of least resistance will flow through the passage 18, transmitting some of its heat to the core or radiator and thawing the congealed oil therein. The control valve being in its normal open position permits free flow of the oil through the valve chamber and around the thermostatic control member, and thence to the outlet. As the temperature of the oil returning from the engine increases, the thermostatic element is expanded to cause the valve to gradually approach its seat 54, thereby restricting the flow of warm oil therethrough, and causing more and more of the warm oil to be diverted through the radiator or core of the cooler or heat exchange unit where it is subjected to cooling influence of circulating air or other cooling medium. If the oil temperature increases further, the valve may be completely closed and the entire oil supply will be circulated through the radiator or cooler core. The thermostatic control member being simultaneously subjected to both the warm and cooled oil, responds to the average temperature and does not effect sudden or extreme movements of the valve, but effects gradual opening and closing movement thereof as may be necessary to maintain the "composite" temperature of the intermingled warm and cool oil within a predetermined relatively narrow range, as it is discharged from the unit. The circulation of cooled oil about the thermostatic member does, however, influence such member in opposition to the influence of the warm oil.

This normal operation should continue for a long period of time, but as sometimes happens, leakages from one source or another do develop and the loss of liquid then causes the valve to go to the cooling or closing position as before described.

Figure 4:
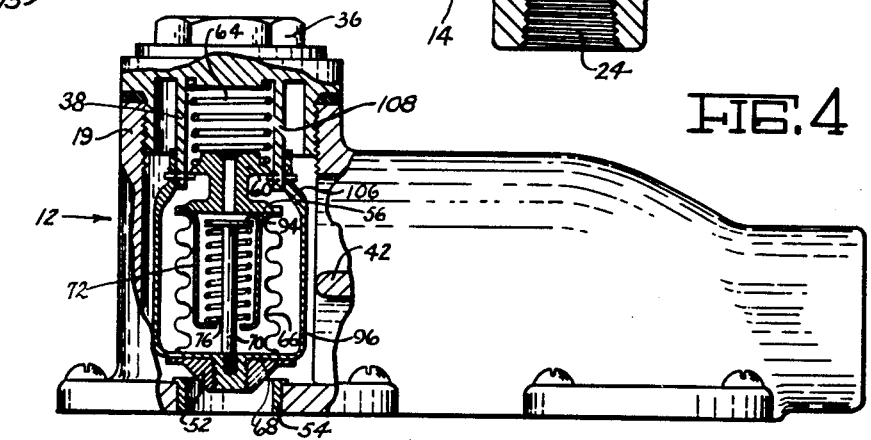
Fig. 4 is a side elevation, partly in section, of an alternative arrangement of the invention, embodying a release that is external of the bellows, whereas the release mechanism used in Fig. 2 is entirely within the bellows.

In Fig. 4 there is described an alternative arrangement which functions in the same manner and produces the same results as that described above, but instead of releasing the precompressed spring 82 in Fig. 2, it releases the spring 64 in the valve cap and permits this spring to move the valve to a closing position.

Figure 5:
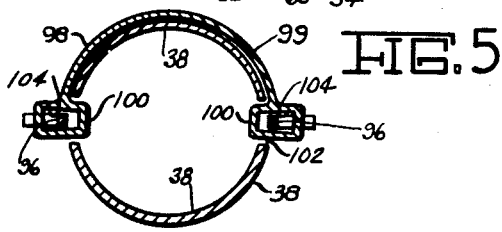
Fig. 5 shows a sectioned view of the cap extension and spring release of Fig. 4.
Figure 7:
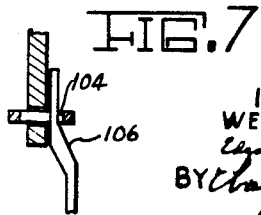
Fig. 7 is an enlarged view of a portion of the sectioned part of Fig. 4 showing more clearly the relationship of the parts composing the release mechanism.

In Fig. 4 the bellows 66, the end plates 56 and 68, and retainer 72 are the same as in Fig. 2, and function in the same way. The center post 70 is likewise the same, except that it has a permanently attached head 94, against which the spring 76 rests and is constantly urging the end plates 68 and 56 toward each other. The head 94 is spaced from the end plate 56 to permit sufficient movement with relation thereto. This arrangement, as in the arrangement shown in Fig. 2, has the bellows chamber filled with sufficient fluid to partially compress the spring 76 at the minimum temperatures which will be encountered. There are attached to the lower end plate the arms 96 which extend upward along the outside of the bellows and mate with the spring release 98. The spring release 98 serves the same function as the snap ring 62 of Fig. 2, under normal operating conditions. It has a spring section 99, Fig. 5, that extends around the tubular extension 38 of the cap 36 and has two key fingers 100 which extend through slots 102 in the extension 38 far enough to form a stop against which the head 60 is urged by the spring 64. The spring release 98 also has openings 104 through which the arms 96 extend. With the valve in the position shown in Fig. 4, the portions of the arms which extend through the openings 104 of the spring release can move freely therein during the normal expansion stroke of the valve without interference by the spring release. The portions of the arms immediately below the spring release, indicated at 106, are inclined to cause engagement with the outer walls of the openings 104 of the spring release, and when the arms are moved upwardly a predetermined distance, these portions of the arms wedge between the spring release and the extension 38 and force the key fingers outwardly so as to release the head 60, which had previously engaged the key fingers, and permit the entire thermostatic element to be forced downwardly by the spring 64. This moves the valve poppet 52 to closing position with respect to the valve seat 54 in substantially the same manner as the arrangement shown in Fig. 2. As has been explained, the liquid in the bellows normally limits the action of the spring 76, but when a leak occurs, this limitation is removed and the spring will move the lower end plate 52 and arms 96 upwardly a distance sufficient to release the spring 64 and thus cause the valve to be closed. The opening 108 is a vent to avoid interference with the normal action by trapping oil in the extension 38.

From the above description it will be apparent that there is thus provided a device of the character described, possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

Having thus described my invention, I claim:

1. An apparatus for controlling the flow of fluid through a port comprising a valve unit mounted for bodily movement including a movable valve member and a temperature responsive element with a normal operating stroke to open and close said valve member with relation to said port in accordance with temperature variations, means for positioning said valve unit for operation of said valve member to open and closed positions within said normal operating stroke of said temperature responsive element, said means permitting bodily movement of said valve unit in one direction to a safety pressure position upon the occurrence of an unsafe pressure condition effective against said valve member in said one direction, and means for effecting movement of said valve member to a safety temperature position upon movement of said temperature responsive element beyond the limit of its normal operating stroke.

2. In an oil cooler arrangement having a cooling passage and a by-pass passage with a removable housing connected to both passages and having a valve unit that controls the flow through the by-pass passage, said valve unit comprising a movable valve member and a temperature responsive element for positioning said valve member in accordance with temperature, means for normally positioning said valve unit in a predetermined position, said means permitting bodily movement of said valve unit to a safety pressure position upon the occurrence of an abnormal pressure condition in said by-pass passage, and means operative to cause movement of said valve member to a safety temperature position upon the failure of the temperature responsive element.

3. In a fluid temperature control apparatus, a housing having a chamber and inlet and outlet passages for said chamber, a valve to control the flow of fluid through said inlet passage to said chamber, a bellows having an end plate on one end thereof in said chamber containing a temperature responsive fluid in a quantity sufficient to maintain said bellows normally in a predetermined partially expanded condition, said valve being connected on the other end of said bellows for movement toward and from its closed position by the expansion and contraction of said bellows, a spring within said bellows to yieldably resist the expansion of said bellows and operable upon the escape of fluid from said bellows to contract the latter beyond said normal condition of partial expansion, a pre-compressed spring so arranged to cooperate with said end plate that the expansion of said pre-compressed spring will produce a force on said end plate to cause movement of said valve to its closed position, and means for normally preventing the expansion of said precompressed spring and said means including a part connected with said valve and cooperable with said end plate to release said pre-compressed spring when said valve is moved by contraction of said bellows beyond said normal condition of partial expansion to a position substantially beyond the normal limit of its opening movement.

4. An apparatus for controlling flow of fluid through a port comprising a valve unit mounted for bodily movement including a movable valve member and a temperature responsive element for positioning said valve member in accordance with temperature, a pre-loaded spring to hold said valve unit in a predetermined normal position wherein said temperature responsive element may position said valve element relative to said port in accordance with temperature, said spring permitting bodily movement of the valve unit in one direction upon the occurrence of a predetermined pressure condition acting on said valve member in said one direction, and a release mechanism for said spring, said spring being arranged to move the valve member in a predetermined direction when released, and said release mechanism being actuated by movement of said temperature responsive element beyond the limit of its normal operating stroke.

5. An apparatus for controlling the flow of fluid through a port comprising a valve unit including a valve member mounted for bodily movement and including a temperature responsive element for positioning said valve member in accordance with temperature, stop means to normally limit the movement of said valve unit toward port closing position, a preloaded spring to hold said valve unit against said stop means and to permit bodily movement of said valve unit in port opening direction when said valve member is subjected to excessive pressure, a release mechanism for said spring, said spring being arranged to close said valve when released, said release mechanism being actuated by movement of said temperature responsive element beyond the limit of its normal operating stroke.

6. An apparatus as claimed in claim 5, wherein the release mechanism comprises means actuated by said valve member to move said stop means to an inoperative position and release said precompressed spring when said valve member is moved beyond the normal limit of its operating movement.

7. In a fluid temperature control apparatus, a housing having a chamber and inlet and outlet passages for said chamber, a valve to control the flow of fluid through said inlet passage to said chamber, a bellows in said chamber containing a temperature responsive fluid in a quantity sufficient to maintain said bellows normally in a predetermined partially expanded condition, said valve being connected with one end of said bellows for movement toward and from its closed position by the expansion and contraction of said bellows, a spring within said bellows to yieldably resist the expansion of said bellows and operable upon the escape of fluid from said bellows to contract the latter beyond said normal condition of partial expansion, a pre-compressed spring arranged exteriorly of said bellows to act on that end thereof opposite said valve, a movable stop to normally prevent the expansion of said precompressed spring, means actuated by said valve to move said stop to an inoperative position and release said pre-compressed spring when said valve is moved beyond the normal limit of its opening movement, and means to limit the movement of the last mentioned end of said bellows toward said valve and cause said valve to be closed by the expansion of said pre-compressed spring.

8. An apparatus for controlling the flow of fluid through a port comprising a valve unit mounted for bodily movement and including a temperature responsive variable volume chamber and a valve member connected with said chamber for movement into and out of port closing position by the normal expansion and contraction of said chamber, stop means to normally limit the movement of said valve unit toward port closing position, a pre-loaded spring to hold said valve unit against said stop means and to permit bodily movement thereof in port opening direction when said valve member is subjected to excessive pressure, and means controlled by the contraction of said chamber beyond a predetermined limit of normal contraction thereof to retract said stop means and release said valve unit for bodily movement by said pre-loaded spring to port closing position.

9. In an oil cooler arrangement having a cooling passage and a by-pass passage with a removable housing connected to both passages and having a valve that controls the flow through the by-pass passage, said valve having a thermostatic element with a temperature related operating stroke to close said valve when subjected to high temperatures, and to open said valve when subjected to low temperatures in order to provide temperature control, a preloaded spring associated with said element that permits said valve to be opened at all times if the pressure against said valve substantially exceeds a predetermined value, a release mechanism for said spring, said spring arranged to close said valve when released, said release mechanism being actuated by the movement of said thermostat beyond the limit of the normal operating stroke.

10. In a cooling system comprising a circulating liquid in a radiator with a cooling passage and a by-pass passage in parallel and a housing in association therewith containing a valve operable in response to the pressure variations resulting from the temperature of a fluid confined in a collapsible and expansible chamber, said housing having separate ports communicating with said parallel passages, a common chamber in communication with both ports, and a common passage between said chamber and another port through which liquid from both parallel passages circulates, said collapsible chamber being located in said common chamber and subject to contact with the liquid flowing in both of said parallel passages, said valve controlling the flow through one of said first two mentioned ports, having a hot position with said expansible chamber expanded and a cold position with said chamber collapsed, a precompressed spring capable of moving said valve to the hot position when released, and means for releasing said spring when said collapsible chamber is collapsed beyond the normal cold position.

11. In a valve for controlling a port and being normally actuated by a movable member of a variable volume chamber that responds to pressure variations of a temperature sensitive fluid in said chamber, spring means within said variable volume chamber to oppose said pressures, spring means limited by stops associated with said valve and chamber to yieldably resist opening movement of said valve in response to forces being present in said port acting in a direction to open said valve, and release means for rendering said stops ineffective and permitting said last-mentioned spring means to move said valve in a predetermined manner, said release means controlled in response to the movement of said movable member a predetermined distance in a direction opposite the direction in which said valve is moved by said precompressed spring means.

12. In a fluid temperature control apparatus, a housing having a chamber and inlet and outlet passages for said chamber, a valve to control the flow of fluid through said inlet passage to said chamber, a bellows in said chamber containing a temperature responsive fluid in a quantity sufficient to maintain said bellows normally in a predetermined partially expanded condition, said valve being connected with said bellows for movement toward and from its closed position by the expansion and contraction of said bellows, a spring within said bellows to yieldably resist the expansion of said bellows and operable upon the escape of fluid from said bellow to contract the latter beyond said normal condition of partial expansion, a second spring connected with said valve and adapted upon expansion to move said valve to its closed position, a device for retaining said second spring in a compressed condition during the normal operation of said bellows and including means operable to release said second spring upon the contraction of said bellows beyond said normal condition of partial expansion.

13. In a fluid temperature control apparatus, a housing having a chamber and inlet and outlet passages for said chamber, a valve to control the flow of fluid through said inlet passage to said chamber, a bellows in said chamber containing a temperature responsive fluid in a quantity sufficient to maintain said bellows normally in a predetermined partially expanded condition, said valve being connected with one end of said bellows for movement toward and from its closed position by the expansion and contraction of said bellows, a spring within said bellows to yieldably resist the expansion of said bellows and operable upon the escape of fluid from said bellows to contract the latter beyond said normal condition of partial expansion, a stud secured at one end to said valve and of such length that the other end thereof will be spaced from that end of said bellows opposite said valve when said bellows is in said normal partially expanded condition, a stop mounted on said stud for movement lengthwise thereof, releasable means to hold said stop normally against movement toward the last mentioned end of said stud and operable by contact with the adjacent end of said bellows to retract said stop, and a pre-compressed spring confined between said stop and said valve, whereby the movement of said valve beyond the normal limit of its opening movement will release said stop and permit said pre-compressed spring to act against the end of said bellows and move said valve to its closed position.

14. In a fluid temperature control apparatus, a housing having a chamber and inlet and outlet passages for said chamber, a valve to control the flow of fluid through said inlet passage to said chamber, a bellows in said chamber containing a temperature responsive fluid in a quantity sufficient to maintain said bellows normally in a predetermined partially expanded condition, said valve being connected with said bellows for movement toward and from its closed position by the expansion and contraction of said bellows, a stud secured to said valve within said bellows and having a head spaced normally a short distance from that end of said bellows opposite said valve, a member secured to the last mentioned end of said bellows and having a supporting part arranged between the head of said stud and said valve, a spring arranged between the head of said stud and said supporting part to resist the expansion of said bellows and to contract said bellows beyond its normal condition of partial expansion upon the escape of fluid from said bellows, a pre-compressed spring arranged between the last mentioned end of said bellows and a part of said housing, a movable stop to normally prevent the expansion of said pre-compressed spring, and a member connected with said valve and having a part operable upon the movement of said valve beyond the normal limit of its opening movement to retract said stop and permit said pre-compressed spring to expand and move the adjacent end of said bellows against the head of said stud and thereby move said valve to its closed position.

WELDON WORTH.

REFERENCES CITED

The following references are of record in the file of this patent:

UNITED STATES PATENTS

| Number | Name | Date |
| --- | --- | --- |
| 1,752,116 | Smith | Mar. 25, 1930 |
| 2,202,705 | Martin-Hurst | May 28, 1940 |
| 1,820,035 | Stokes | Aug. 25, 1931 |
| 1,920,458 | Bast | Aug. 1, 1933 |
| 1,952,516 | Sperry | Mar. 27, 1934 |
| 2,123,921 | Anderson | July 19, 1938 |
| 371,088 | Merrill | Oct. 4, 1887 |
| 1,433,416 | Reed | Oct. 24, 1922 |
| 1,972,766 | Ewald | Sept. 4, 1934 |
| 1,605,313 | Whitehead | Nov. 2, 1926 |

FOREIGN PATENTS

| Number | Country | Date |
| --- | --- | --- |
| 768,316 | France | May 14, 1934 |